3,532,761
STABILIZATION OF METHYL CHLOROFORM
James A. Manner, Akron, Ohio, assignor to PPG Industries, Inc., Pittsburgh, Pa., a corporation of Pennsylvania
No Drawing. Filed May 7, 1969, Ser. No. 822,706
Int. Cl. C07c 17/40
U.S. Cl. 260—652.5                    5 Claims

ABSTRACT OF THE DISCLOSURE

Methyl chloroform is formulated with a 3-alkoxyoxetane, notably 3-methoxyoxetane.

BACKGROUND OF THE INVENTION

Methyl chloroform (1,1,1-trichloroethane) is an industrial solvent widely used for degreasing. Its usefulness in degreasing metals, especially light metals such as aluminum, is restricted because of its high degree of sensitivity to decomposition in the presence of aluminum. This sensitivity is especially acute when the methyl chloroform contacts aluminum containing freshly exposed surfaces such as when the aluminum is scratched while submerged in methyl chloroform. Without the protection offered by formulating with the appropriate additive, methyl chloroform under such circumstances, decomposes into an unmanageable black tarry mass in a relatively brief period. It is thus commonplace to add to the methyl chloroform certain additives to protect it against decomposition, including that type of decomposition which is particularly acute in the presence of freshly exposed surfaces of aluminum.

Even greater than its sensitivity to decomposition in the presence of freshly exposed aluminum surfaces is methyl chloroform's sensitivity to decomposition when a film of it is trapped between surfaces of aluminum strips under some pressure. Thus, when a methyl chloroform film is trapped between stacked aluminum panels it evidences an alarming tendency to decompose even though formulated with many of those stabilizers which prevent other types of aluminum induced decomposition.

SUMMARY OF THE INVENTION

This invention relates to methyl chloroform formulations. It is particularly concerned with the provision of methyl chloroform formulations which resist decomposition, especially that type of decomposition which methyl chloroform encounters when trapped as a film between stacked aluminum panels. Thus, the present invention provides methyl chloroform formulations of enhanced stability.

It has now been discovered that the incorporation of small amounts of a 3-alkoxyoxetane in methyl chloroform results in a methyl chloroform composition which evidences resistance to decomposition including the decomposition which is otherwise encountered when a film of methyl chloroform is trapped between stacked aluminum panels. Thus, in accordance with the present invention methyl chloroform containing a minor concentration, usually at least about 0.5 percent by weight of a 3-alkoxyoxetane exemplified by 3-methoxyoxetane is formulated.

Useful alkoxyoxetanes may be depicted by the following structural formula:

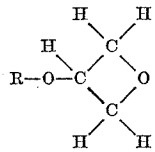

R representing a lower alkyl group, notably an alkyl group of 1 to 4 carbon atoms such as a methyl, ethyl, propyl, n-propyl, isopropyl, n-butyl, secondary butyl or isobutyl.

Depending upon a variety of other considerations, the exact amount of alkoxyoxetane incorporated in the methyl chloroform is subject to variation. An effective stabilizing concentratoin of the alkoxyoxetane, notably 3-methoxyoxetane, is usually on the order of from 1.5 to 5 weight percent of the methyl chloroform. Except for the expense, higher concentrations may be used. When the methyl chloroform is formulated with other additives besides 3-methoxyoxetane, the 3-methoxyoxetane concentration will in general be lower than when 3-methoxyoxetane is the only stabilizing additive. Since commercial methyl chloroform formulations generally include a plurality of additives, each one of which is apt to be included to handle a particular problem or type of sensitivity to decomposition, the concentration of 3-methoxyoxetane in most formulations is apt to be on the order of between 1.0 and 3.0 percent by weight of the methyl chloroform.

The methyl chloroform formulations herein contemplated are prepared by simply admixing in appropriate proportions the methyl chloroform and 3-methoxyoxetane.

The following examples illustrate the advantages of the present invention and the manner in which it may be practiced.

The following test procedure evaluates the performance of a methyl chloroform composition under those conditions where a film of the solvent composition is trapped between stacked aluminum panels, a condition which exerts an extremely strong deleterious influence upon the methyl chloroform.

A one-half inch by two inch coupon of 2024 aluminum is placed in a glass evaporating dish (or like shallow container) along with a sufficient quantity of the liquid methyl chloroform composition to be tested. With the coupon below the surface of the liquid, a shallow circular hole is bored in the surface of the coupon using a metal scribe. Thereupon a second identical aluminum coupon is quickly placed on the top of the first and pressed against the top to force the two coupons as close together as possible. The results are then observed visually. In particular, the condition of the spot where the shallow circular hole is bored in the surface of the coupon is noted as well as the gas evolution and other signs of solvent state, notably discoloration, are observed.

In general, a formulation is regarded to have been effectively protected against decomposition of the type measured by this test when there is either no initiation of decomposition or no evidence of continuing decomposition (such as streamers of discoloration in the solvent) ten minutes after the second coupon was placed upon the first coupon.

EXAMPLE 1

Methyl chloroform containing 3 weight percent 3-methoxyoxetane was formulated and tested by the described test procedure. Ten minutes after placing the second coupon upon the first there was no sign of gas evolution and no color streamers in the solvent.

This stability of methyl chloroform containing 3-methoxyoxetane as shown by this test is noteworthy since many other additives suggested as effective in the stabilization of methyl chloroform ether do not provide for protection against the type of decomposition this test measures or require considerably larger concentrations.

For example, methyl chloroform containing 3 weight percent 1,4-dioxane (which according to U.S. Letters Patent 2,811,252 is an exemplary additive for stabilizing methyl chloroform) evidenced immediate gas evolution and prompt generation of color streamers.

EXAMPLE 2

Methyl chloroform containing by weight 3 percent 3-methoxyoxetane, 0.5 percent nitromethane and 0.3 percent butylene oxide (mixture of the 1,2 and 2,3-isomers) was formulated and tested by the aforedescribed procedure. There was no visual evidence of decomposition ten minutes after the second coupon was placed on the first.

EXAMPLE 3

Methyl chloroform of the following composition was tested by the aforedescribed procedure:

Additive: Concentration
    Nitromethane _____(Percent by wt.)__ 2.0
    1,3-dioxolane _____do____ 1.0
    Toluene _____do____ 0.8
    Methyl ethyl ketone _____do____ 0.75
    Isobutyl alcohol _____do____ 0.75
    Butylene oxide[1] _____do____ 0.3
    3-methoxyoxetane ____(Percent by volume)__ 2.0

[1] A mixture of the 1, 2 and 2, 3 isomers.

After the ten minute period there was no signs of gas evolution, no solvent discoloration and the strip was clear.

The presence of a 3-alkoxyoxetane in methyl chloroform advantageously alters the formulation's evaporation rate. Methyl chloroform compositions such as the formulation set forth in Example 3 (less 3-methoxyoxetane) usually evaporate somewhat more slowly than may be desirable. It has been found that the presence of the alkoxyoxetane, notably 3-methoxyoxetane, produces a dramatic increase in the evaporation rate, as the ensuing example illustrates.

EXAMPLE 4

A 0.1 milliliter portion of the methyl chloroform formulation described in Example 3 was poured via a microliter pipette onto the center of a two inch by three inch mirror (washed with acetone and air dried). Upon completing the pouring, a stop watch was used to determine the period of time it took the sample to evaporate completely. Formulations identical to that of Example 3 except for the omission of 3-methoxyoxetane or using 1 volume percent 3-methoxyoxetane were tested. This procedure was performed in duplicate for each formulation with these results:

| Formulation | Volume percent | Evaporation time (seconds) [1] |
|---|---|---|
| 3-methoxyoxetane | 2.0 | 67:69 |
| Do | 1.0 | 71:65 |
| None | | 125:122 |

[1] Results of each duplicate run.

As demonstrated by the foregoing examples, the alkoxyoxetanes are not the only additives which may be incorporated in a methyl chloroform composition. Other additives may and are included along with the 3-alkoxyoxetanes.

Besides 1,3-dioxolane, other 1,3-dioxolanes may be included. These include 1,3-dioxolanes containing up to two alkyl substituents each of the alkyl substituents having from 1 to 2 carbon atoms, such as 4-methyl-1,3-dioxolane, 2-ethyl-1,3-dioxolane, 2,2-dimethyl-1,3-dioxolane, 4,4-diethyl-1,3-dioxolane, 2,5-dimethyl-1,3-dioxolane, 2-methyl-4-ethyl-1,3-dioxolane and the like (including those enumerated in column 6 of U.S. Letters 3,397,148). Generally, those 1,3-dioxolanes normally boiling within the range of 50° C. to about 120° C., more ideally in the range of 65 to 85° C. are preferable.

Nitroalkanes other than the preferred nitromethane may be employed including nitroaliphatics having up to 3 carbon atoms, notably nitroethane, 1-nitropropane and 2-nitropropane.

In lieu of or in combinaiton with either or both of the butylene oxide isomers, the preferable epoxide, other epoxides which are of use include epichlorohydrin, glycidol, propylene oxide, cis-2,3-pentene oxide, 2-methyl-2,3 - epoxybutane, 1,2-epoxycyclopentene, 2,3-dimethyl-2,3-epoxybutane, 2-chloro-3,4-epoxybutane, 1-chloro-2,3-epoxybutane, styrene oxide, butadene diepoxide and the like. Preference is for saturated monoepoxides containing from 3 to 8 carbon atoms ideally 4 to 6 carbon atoms.

Additionally, methyl chloroform compositions may be improved by the incorporation therein of other additives including acetylenic alcohols, that is alkynols and short chain aliphatic monohydric saturated alcohols. Useful acetylenic alcohols include those which contain from 3 to 12 carbon atoms and a single triple bond. By way of illustration such acetylenic alcohols include 2-methyl-3-butyn-2-ol, propargyl alcohol, 2-butyn-1-ol, 3-butyn-2-ol, 2,5 - dimethyl-3-hexyn-2,5-diol, 3-6-dimethyl-4-octyn-3,6-diol and the like. The particular useful saturated monohydric alcohols have from 1 to 8 carbon atoms among which may be mentioned the alkanols methanol, n-propanol, isopropanol, sec-butanol, t-butanol, n-butanol, isobutanol, t-amyl alcohol, hexanol, octanol and mixtures thereof.

Other additives which impart desirable properties to methyl chloroform including 1,4-dioxane; alkanoic acid and esters thereof such as methyl alpha-hydroxy isobutyrate, ethyl acetate, etc.; ketones such as acetone, methyl ethyl ketone, etc.; nitriles exemplified by acetonitrile and acrylonitrile; ketols such as acetol; dialkyl sulfoxides such as dimethyl sulphoxide, di-isopropyl sulfoxide, methyl ethyl sulfoxide, organic derivatives of hydrazine such as hydrazones exemplified by acetaldehyde dimethyl hydrazone, formaldehyde dimethyl hydrazone and the like; organic nitrates such as isopropyl nitrate, ethyl nitrate, methyl nitrate, 2-ethoxy nitrate; dialkyl ethers of diols (notably the dialkyl ethers specifically numerated in U.S. Letters patent 3,128,315 exemplified by dimethoxyethane). Other liquid hydrocarbons (aliphatic and aromatic) in lieu of or in addition to toluene can be included. For example, n-hexane, pentane or like hydrocarbon is a useful component in providing an all purpose methyl chloroform composition.

The total concentration of all additives incorporated with the methyl chloroform for purposes of coping with methyl chloroform's tendency to decompose under the variety of conditions it is apt to be exposed to in use should be below 10 percent by weight of the methyl chloroform. Thus, in those methyl chloroform compositions containing a plurality of additives, it is generally good practice to minimize the concentration of any one particular additive recognizing the impact upon total additive concentration the other additives impose. Rarely, will the concentration of any one additive exceed 5 percent by weight; more aptly it will range below 3.5 weight percent downwardly to 0.1 weight percent.

Particular combinations of a 3-alkoxyoxetane with the other additives are incorporated in methyl chloroform with special advantage. Thus, as illustrated in Example 2, the alkoxyoxetane is used in combination with a nitroalkane such as nitromethane and alkylene oxide exemplified by a butylene oxide to provide an effective methyl chloroform formulation. Such a formulation is not only resistant to the type of decomposition which the test procedure hereindescribed is designed to test for, but demonstrates stability as to other conditions. The joint use of the alkoxyoxetane and 1,3-dioxolane, notably dioxolane also is especially appropriate. Such formulations which include both the alkoxyoxetane and 1,3-dioxolane for certain purposes advantageously may also include nitroalkane such as nitromethane and/or epoxides exemplified by the butylene oxides.

Ketones such as methyl ethyl ketone, methyl isopropyl ketone, diethyl ketone, 2-hexanone, methyl-t-butyl ketone, acetyl acetone, mesityl oxide, phorone, cyclohexanone, acetophenone and ketols such as acetol, 4-hydroxy-2-butanone and 5-hydroxy-3-pentanone also are advantageously combined with 3-alkoxyoxetanes.

While the present invention has been described by reference to specific details of certain embodiments, it is not intended that the invention be construed as limited to such specific details except insofar as such details appear in the claims.

I claim:
1. Stabilized methyl chloroform containing a stabilizing concentration of a lower 3-alkoxyoxetane of the formula:

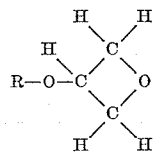

wherein R is an alkyl group having 1 to 4 carbon atoms.

2. The composition of claim 1 wherein 3-methoxyoxetane is the said oxetane and its concentration is at least about 0.5 weight percent but below 10 weight percent.

3. The composition of claim 1 wherein the methyl chloroform contains in addition to the 3-alkoxyoxetane at least one of the following: a 1 to 3 carbon nitroalkane, an unsubstituted 3–8 carbon atom saturated monoepoxide, glycidol, epichlorohydrin, 1,4-dioxane, 1,3-dioxalanes containing up to two alkyl substituents, each of the alkyl substituents having from 1 to 2 carbon atoms, acetone, methyl ethyl ketone, methyl isopropyl ketone, diethyl ketone, acetonitrile, acrylonitrile, an alkynol having from 3 to 12 carbon atoms and an alkanol having from 1 to 8 carbon atoms.

4. Methyl chloroform containing a stabilizing amount of 3-methoxyoxetane.

5. The composition of claim 4 which contains in addition to 3-methoxyoxetane at least one further additive selected from the group consisting of nitromethane, an unsubstituted 3 to 8 carbon saturated monoepoxide, 1,4-dioxane, glycidol, epichlorohydrin, 1,3-dioxolanes containing up to two alkyl substituents, each of the alkyl substituents having from 1 to 2 carbon atoms, acetone, methyl ethyl ketone, methyl isopropyl ketone, diethyl ketone, acetonitrile, acrylonitrile and an alkanol having from 1 to 8 carbon atoms and mixtures thereof and wherein the total concentration of all additives is below 10 weight percent.

References Cited
UNITED STATES PATENTS

| | | | |
|---|---|---|---|
| 2,371,645 | 3/1945 | Aitchison et al. | 260—152.5 |
| 2,811,252 | 10/1957 | Bachtel | 260—652.5 XR |
| 2,923,747 | 2/1960 | Rapp | 260—652.5 |
| 2,947,792 | 8/1960 | Skeeters | 260—652.5 |
| 3,201,482 | 8/1965 | Fredenburg | 260—652.5 |
| 3,251,891 | 5/1966 | Cormany et al. | 260—652.5 |
| 3,265,747 | 8/1966 | Cormany et al. | 260—652.5 |
| 3,285,857 | 11/1966 | Rathbone et al. | 260—652.5 XR |
| 3,326,989 | 6/1967 | Cormany et al. | 260—652.5 |
| 3,445,532 | 5/1969 | Richtzenhain et al. | 260—652.5 |

FOREIGN PATENTS

| | | |
|---|---|---|
| 244,295 | 4/1963 | Australia. |
| 624,485 | 11/1962 | Belgium. |

HOWARD T. MARS, Primary Examiner

U.S. Cl. X.R.
252—170, 407